United States Patent [19]

Kennedy et al.

[11] 3,904,708

[45] Sept. 9, 1975

[54] PROCESS FOR GRAFT POLYMERIZATION

[76] Inventors: Joseph P. Kennedy, 632 Lincoln Park East, Cranford, Union County, N.J. 07016; Francis P. Baldwin, 19 Winchester Rd., Summit, Union County, N.J. 07901

[22] Filed: Jan. 8, 1968

[21] Appl. No.: 700,324

Related U.S. Application Data

[63] Continuation-in-part of Ser. No. 568,001, July 26, 1966, abandoned, which is a continuation-in-part of Ser. No. 364,295, May 1, 1964, abandoned.

[52] U.S. Cl. .... 260/878 R; 260/23 XA; 260/32.8 A; 260/33.6 A; 260/33.8 UA; 260/45.75 K; 260/879; 260/880 R; 260/884; 260/886; 117/132 CB

[51] Int. Cl.² ... C08F 4/52; C08F 259/02; C08F 279/02

[58] Field of Search ........ 260/878, 878 B, 879, 877, 260/884, 880, 878 R, 880 R

[56] References Cited

UNITED STATES PATENTS

| | | | |
|---|---|---|---|
| 2,842,518 | 7/1958 | Irvin | 260/45.5 |
| 3,135,717 | 6/1964 | Gregorian et al. | 260/45.5 |
| 3,143,521 | 8/1964 | Thompson et al. | 260/45.5 |
| 3,144,426 | 8/1964 | Burke et al. | 260/29.7 |
| 3,187,067 | 6/1965 | Beredjick | 260/877 |
| 3,205,188 | 9/1965 | Cole | 260/29.7 |
| 3,253,057 | 5/1966 | Landler et al. | 260/877 |
| 3,267,051 | 8/1966 | Landler et al. | 260/2.5 |
| 3,446,873 | 5/1969 | Saito et al. | 260/880 |
| 3,458,599 | 7/1969 | Daumiller et al. | 260/879 |
| 3,476,831 | 11/1969 | Daumiller et al. | 260/879 |
| 3,496,251 | 2/1970 | Takahashi et al. | 260/876 |
| 3,511,896 | 5/1970 | Harmer | 260/876 |

FOREIGN PATENTS OR APPLICATIONS

| | | |
|---|---|---|
| 817,684 | 8/1959 | United Kingdom |
| 837,335 | 6/1960 | United Kingdom ................ 260/880 |

OTHER PUBLICATIONS

Koekelbergh et al., Ionic Grafting, J. Polymer Sci., 33:227–234, (1958).

*Primary Examiner*—James A. Sedleck
*Assistant Examiner*—Stanford M. Levin

[57] ABSTRACT

Aluminum trialkyl and aluminum dialkyl monohalide catalysts can be used to graft cationically polymerizable monomers, such as styrene, chloroprene, isobutylene, etc. to halogenated polymers with some highly reactive halogen atoms such as PVC, neoprene, chlorobutyl, etc.

3 Claims, 2 Drawing Figures

PROCESS FOR GRAFT POLYMERIZATION

CROSS REFERENCES TO RELATED APPLICATIONS

This application is a Continuation-in-Part of copending commonly assigned application Ser. No. 568,001 filed July 26, 1966 now abandoned which in turn is a Continuation-in-Part of copending commonly assigned application Ser. No. 364,295 filed May 1, 1964 now abandoned.

BACKGROUND OF THE INVENTION

It has been previously disclosed (see P. H. Plesch, Chem. and Ind., page 954, July 26, 1958) that graft copolymers can be prepared by the "grafting from method" using $AlCl_3$, $TiCl_4$, etc. catalysts to abstract chlorides from a polyvinyl chloride backbone and subsequently to introduce a monomer such as styrene which polymerizes at the carbonium ion site created on the backbone. There are many difficulties and disadvantages to this prior art technique. Some of these are: a) only minor quantities and yields of the graft polymerization can be obtained even under the best circumstances since the kinetics of the reaction strongly favor the production of homopolymer rather than graft polymer; b) the backbone polymer is seriously degraded; c) the catalyst solubility is incompatible with the backbone polymer solubility, and d) the physical properties of the resulting materials are unsatisfactory.

SUMMARY OF THE INVENTION

This invention relates to a process for synthesizing graft polymers from halogenated polymer backbones and the products produced thereby which can include the complete reaction product or selected portions thereof. Even more particularly, the invention relates to the graft polymerization of halogenated polymers with cationically polymerizable monomers and the resulting graft polymers.

It has now been discovered and forms the substance of this invention, that graft copolymers can be obtained using the process set forth herein in substantial yields and with only moderate amounts of homopolymer formation. Moreover, the resulting blends of graft copolymers and homopolymers are also useful compositions. Therefore, it is not necessary in every instance to separate the graft polymer from the polymeric reaction product.

In brief, the process of the invention involves dissolving a halogenated polymer in an inert solvent incorporating an $Al(M)_2R$ compound and introducing a cationically polymerizable monomer at a temperature of from about −90° to +70°C. with agitation for period sufficient to complete the reaction. The contacting of these starting materials with each other can be done in any order. However, it is least preferred to premix the halogenated polymer with the $Al(M)_2R$ compound. The halogenated polymer and the $Al(M)_2R$ compound when used together act as the active catalyst system.

DESCRIPTION OF THE PREFERRED EMBODIMENT

Figure 1:
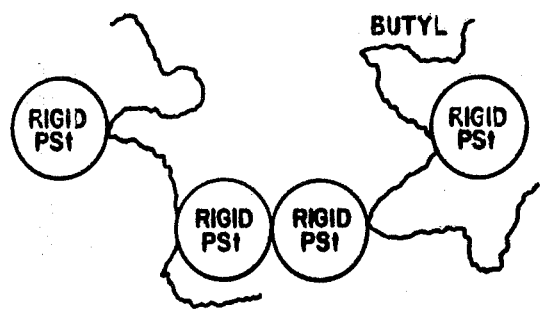

The polymers suitable for use as backbone polymers include any halogenated, i.e., chlorinated, brominated, iodinated, or fluorinated polymer in which the halogen atoms are on an allylic, tertiary or benzylic carbon atom. By allylic it is meant

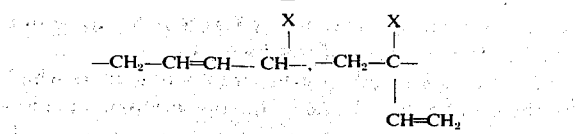

and the like; by tertiary it is meant

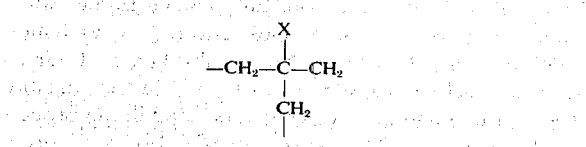

and the like; by benzylic, it is meant

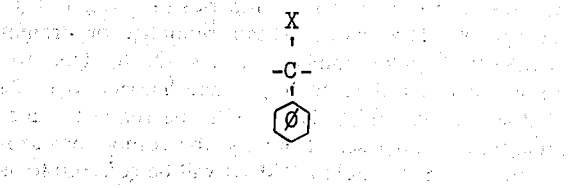

and the like, all when X is halogen. Chlorine-containing polymers are preferred. The polymers can be prepared from halogenated monomers or the halogen functionality can be introduced with any suitable post-polymerization technique. Thus, most hydrocarbon high polymers can be used as the backbone polymer for the synthesis after a suitable post-polymerization treatment. The invention also includes the concept of using halogenated low molecular weight materials such as chlorinated liquid paraffins, chlorinated waxes and the like. These liquid materials can be regarded as being halogenated oligomers. They should have at least 6 repeating units. If the functionality of the backbone polymer or oligomer is at the end of the chain, it is possible to obtain block copolymers of the A-B type.

Suitable examples of polymers which can be used in the backbone are polyvinyl chloride, polyvinylidene chloride, polyvinylbromide, polyvinylfluoride, polytetrafluoroethylene (Teflon), polyvinyl alcohol, polychloroprene, as well as polymers which have been modified by post-polymerization treatment to introduce functionality, for example, chlorobutyl, chlorinated polyethylene, chlorinated polypropylene chlorinated ethylene-propylene copolymer, chlorinated or hydrochlorinated natural rubber, poly-cis-isoprene, poly-cis-butadiene, polystyrene, polypiperylene, hydrochlorinated butyl rubber, etc.

However, it must be noted that it is important that the polymer backbone or starting oligomer material must not contain groups which would interfere with the catalyst or deactivate it. Groups which would tend to have this effect are —CO, —COOR, —NH—, —SH, and —$NO_2$. Thus, polymers such as polyacrylonitrile, polyacrylates, polyesters, nylons, polysulfides and the like are unsuitable for the purposes of this invention.

It will be noted that some of the halogenated polymers specifically set forth above are not normally thought to contain allylic, tertiary or benzylic functionality, i.e., polyvinyl chloride. However, only a very small amount of such functionality is necessary, i.e., about 0.01 to 5 mole percent, preferably 0.1 to 3 mole percent, and most preferably, 0.5 to 3 mole percent is necessary. For some reason, such polymers contain adequate amounts of the requisite functionality to be suitable for the purposes of this invention.

Suitable cationically polymerizable monomers which can be used in the process of the invention include isobutylene, styrene and its derivatives, propene, 1-pentene, 2-ethyl-1-hexene, butadiene, isoprene, chloroprene, dimethyl butadiene, piperylene, cyclopentadiene, cyclohexadiene, β-pinene, methylene norbornene, etc. The list of cationically polymerizable monomers on page 286 of a book entitled "Copolymerizations" edited by G. E. Ham, published by Interscience Publishers, New York (1964) is further illustrative of the monomers which can be used in the process of the invention. This portion of the book is incorporated herein by reference.

The catalyst system, which is an essential feature of the present novel process, comprises (1) a catalyst of the type $Al(M)_2R$, where M is a branched or straight chain $C_1$ to $C_{12}$ alkyl radical and R is selected from the group consisting of M, hydrogen and halogen, and (2) a halogen containing polymer with the requisite functionality. For purposes of brevity, the compounds represented by the formula $Al(M)_2R$ will be referred to as the "catalyst" though it should be realized that these compounds will, be themselves, not act as a catalyst in the graft polymerizations of this invention. The halogenated polymer is also part of the catalyst system and really is a macro coinitiator.

Catalyst components which are not operable in the process of the invention can be represented by the formula: $MeZX_n$ where Me is any metal (including boron). Z can either be X or an alkyl radical. X is halogen and $n$ is a number from 2 to 5. Therefore, compounds of the type $MeZX_n$ should not be present in the reaction in quantities sufficient to exert catalytic effects.

The catalyst components utilized in the present novel catalyst system are those compounds represented by the general formula $Al(M)_2R$, where M is a branched or straight chain alkyl group having from 1 to 12 carbon atoms and R is selected from the group consisting of M, hydrogen and halogen. Suitable catalyst compounds coming within the scope of the above general formula include: diethyl aluminum chloride, dipropyl aluminum chloride, diisopropyl aluminum chloride, dibutyl aluminum chloride, diisobutyl aluminum chloride, dipentyl aluminum chloride, dihexyl aluminum chloride, didecyl aluminum chloride, diethyl aluminum bromide, diisobutyl aluminum bromide, dioctyl aluminum bromide, didodecyl aluminum bromide, diethyl aluminum iodide, dibutyl aluminum iodide, diheptyl aluminum iodide, dinonyl aluminum iodide, ethyl propyl aluminum chloride, propyl butyl aluminum chloride, ethyl propyl aluminum bromide, diethyl aluminum hydride, dibutyl aluminum hydride, dihexyl aluminum hydride, trimethyl aluminum, triethyl aluminum, methyl diethyl aluminum, dimethyl ethyl aluminum, triisobutyl aluminum, trihexyl aluminum, etc. The compounds of the subclass illustrated by the formulas $AlR_3$ and $AlR_2X$ where R is a straight chain alkyl group having 1-12 carbon atoms and X is halogen, are preferred. Particularly preferred are triethyl aluminum and diethyl aluminum chloride, which will be used here for illustrative purposes.

Diethyl aluminum chloride, which is commercially available, is a clear colorless liquid with a melting point of −74°C., and a boiling point of 208°C. The substance is highly reactive with oxygen and will burst into flames in air and react violently with water. It is miscible with saturated aliphatic and alicyclic hydrocarbons, chlorinated hydrocarbons, carbon disulfide, etc. Diethyl aluminum chloride may be prepared from aluminum triethyl and aluminum chloride according to the following formula: $2Al(C_2H_5)_3 + AlCl_3 \rightarrow 3Al(C_2H_5)_2Cl$ In general, any inert solvent can be used. For the purpose of this invention inert solvents are defined as those which will not deactivate the catalyst. Suitable examples of such solvents are aliphatic hydrocarbons, e.g., pentane, hexane, or chlorinated hydrocarbons, e.g., methyl chloride, $ClCH_2CH_2Cl$, o-chloro-toluene, carbon disulfide, methylene dichloride, carbon tetrachloride, chlorobenzene, toluene, cyclohexane, methylcyclohexane, etc.

The temperature at which the synthesis is carried out will range from +70° to −90°, preferably +40° to −80°, and most preferably +30° to −70°C.

Moreover, in certain situations, the process of the invention can be carried out with no solvents. In these instances, the unreacted monomers would act as the solvent. For instance, certain low molecular weight polyvinyl chlorides can be dissolved in liquid styrene monomer. Upon addition of the catalyst, the grafting reaction will be initiated and will be limited only by the disappearance of the monomer, i.e., liquid phase.

Using the technique of this invention, great control can be exercised over the type of branches which are synthesized on the backbone polymer. These grafted branches can be long, high molecular weight chains or low molecular weight oligomers having only a few units. Moreover, it is possible to form graft polymers where the branches are copolymers. An example of this is the grafting of a copolymer of isobutene and a diene into polyvinyl chloride or chlorinated ethylene-propylene rubber.

It is one of the advantages of this invention that great scope is afforded to the synthesizer to produce products of widely varying properties. For instance, materials such as polyvinyl chloride can be grafted with monomers such as isobutylene to produce clear pliable films and pads on compression molding. Thus, by utilizing the technique of the invention, polyvinyl chloride, normally a brittle material, can be superplasticized by the graft branches so that the addition of extraneous plasticizers which are normally absolutely essential can be dispensed with or the required quantity can be greatly reduced. The materials which have been plasticized by grafting according to the process of this invention, are referred to as "internally plasticized polymers."

The versatility of the invention is also evident in a completely different aspect. Thus, it is possible to graft cationically polymerizable diene monomers to a polymer backbone to produce sulfur vulcanizable materials. For example, isoprene was grafted onto a halogenated ethylene-propylene copolymer rubber. The resulting product was sulfur cured using a standard vulcanization recipe. Its volume swell and per cent insoluble characteristics were almost identical to that of a sulfur vulcanizable ethylene-propylene terpolymer obtainable commercially from DuPont as Nordel.

It is also possible to obtain unusual polymers having both the properties of a thermoplastic resin and of an elastomer. Thus, when styrene is grafted onto a halogenated butyl rubber backbone, the resulting graft polymers have an unusual molecular configuration in which the butyl rubber backbone elastic phase is chemically bound to a repeated glasslike polymer phase, i.e., the polystyrene glass, to result in a material which is schematically illustrated in FIG. 1. This material may be thought of as analogous to a cured rubber where the cross-links are the glass-like phase and the backbone is the elastic phase. Thus, elastic properties in a thermoplastic material can be obtained.

In a typical polymer of this type, the stress relaxation was investigated at 30°C. under a variety of extensions (from 10–100 percent) and over a variety of times (from 1 day to 2 weeks). The unvulcanized sample did not show permanent set after one month of testing, i.e., it completely recovered its original length and shape. Apparently, the rigid polystyrene areas are held together by strong enough bonds so that the overall system behaves like a vulcanized unit. However, the cohesion between the rigid areas can be disrupted by solvents, i.e., the system is soluble. Moreover, these graft copolymers have very peculiar solubility properties. For example, a particular butylpolystyrene graft containing about 40 mole percent polystyrene was soluble in methyl ethyl ketone (MEK) and in n-heptane, solvents which do not dissolve both individual components, i.e., butyl is insoluble in MEK and polystyrene is insoluble in n-heptane. Nevertheless, the graft is soluble in both of these systems, possibly because the soluble moiety drags the insoluble moiety into solution.

Thus, it will be apparent from the above and the Examples which follow that the physical properties of the graft polymers will be determined from a variety of factors including the choice of the starting backbone material, the cationically polymerizable monomers used, the backbone to graft branching ratios, etc. The graft polymers will have properties ranging from materials which have elastomeric properties to materials which have plastic properties and those with properties therebetween.

To account for these unique phenomena, a theory has been proposed. It is, in its basic aspect, the supposition that the halogenated polymer or halogenated oligomer is in reality a macromolecular cocatalyst in conjunction with Al(M)$_2$R. Thus, the macromolecular cocatalyst is in effect an initiator which is itself incorporated into the new graft polymer. Schematically, the concept can be expressed as follows.

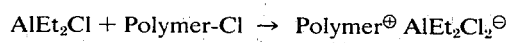

(functional polymer containing very few functional sites)

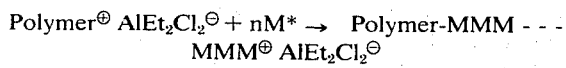

*M is the cationically polymerizable monomer.

Thus, under this theory, the AlEt$_2$Cl catalyst removes the halogen, i.e., chlorine, from the polymer thereby generating a carbonium ion site on the polymer backbone. This carbonium ion can then initiate the polymerization of cationically polymerizable monomers. The polymer which is used as a cocatalyst becomes the backbone and the monomer whose polymerization is initiated by the polymeric cocatalyst then forms repeating units which become a branch of the new graft copolymer.

The invention will be further illustrated by the following Examples. In these Examples, all syntheses were carried out in dry glass equipment in a stainless steel dry box under a nitrogen atmosphere.

EXAMPLE 1

Grafting Styrene Onto Chlorobutyl Rubber

Chlorobutyl having a viscosity average molecular weight of 406,000 and containing 1.21 percent of Cl was purified by dissolving in n-pentane and precipitating in acetone; this procedure being repeated 3 times. The final pure polymer, free of stabilizers, etc., was dried in vacuum at 50°C. overnight. Cocatalyst Solution — 1 g. of the purified chlorobutyl was dissolved in 30 ml. n-pentane at room temperature. When this solution was cooled to −50°C., the volume contracted to 26 ml.

| Charge: | 10 ml. styrene |
| | 10 ml. n-pentane |
| | 0.13 ml. AlEt$_2$Cl |

The charge was stored at −50°C. It was a perfectly clear solution. 1st. Control Experiment— 3 ml. of the charge solution was placed in a test tube and stored at −50°C. for a period of 3 hours. During this time no change was noticeable in the system. 2nd Control Experiment— 2 ml. of the charge solution was placed into a test tube and 0.03 ml. tert.-butyl chloride was introduced at −50°C. Immediately vigorous, almost explosive polymerization took place and large amounts of polystyrene formed. Conversion was complete. (This experiment indicates that the catalyst system is active.) Experiment(A)— Into the remaining 15 ml. of charge solution at −50°C.. was introduced 2 ml. of the chlorobutyl solution. Immediate cloudiness indicated a reaction. After 30 seconds large amounts of white polymer filled the tube. The reaction was terminated by adding a few mls. of methanol. Polymer Characterization— The reaction product was placed in 1000 ml. of acetone for 15 hours at room temperature. Acetone is a solvent for homopolystyrene so that this treatment removed this constituent. A small amount of acetone soluble homopolystyrene was removed. After acetone extraction, the polymer was dried in vacuum at 50°C. Yield 2.572 g. of brittle white powder.

Thus, the reaction product contains 0.077g. chlorobutyl backbones and 2.505 g. polystyrene branches.

A small sample of the reaction product was placed in acetone, an excellent solvent for high molecular weight homopolystyrene but a nonsolvent for chlorobutyl. The sample did not dissolve in acetone indicating the presence of chlorobutyl.

Another small amount of this product was placed in toluene, an excellent solvent for both, chlorobutyl and polystyrene. The sample dissolved in toluene.

These solubility tests indicate the presence of a graft copolymer. Infrared spectra confirmed this.

The thermal behavior of the graft copolymer and a control polystyrene sample was investigated on a hotstage microscope under polarized light. Thus, a small amount of graft copolymer and a similar amount of polystyrene (from control experiment 2) were placed side-by-side on a microscope cover plate and the heating was turned on. Simultaneous observations were made as follows:

| Temperature °C. | Graft Copolymer | Control Polystyrene |
|---|---|---|
| 65 | Unchanged | Starts to melt |
| 75 | Unchanged | Strong melting |
| 95 | Softens under pressure | Flows under pressure |
| 97 | No change | Completely molten |
| 100 | Birefringence appears | — |
| 110 | Birefringence | — |
| 122 | Birefringence, starts to lose shape | — |
| 127 | Birefringence, starts to disappear | — |
| 130 | Melts under pressure | — |
| 137 | Flows under pressure | — |

Experiment (B)— This experiment was carried out under identical conditions to Experiment (A) except a more dilute styrene was used. Thus Charge:   10 ml. styrene
          210 ml. n-pentane
          0.13 ml. AlEt$_2$Cl The charge was stirred in a beaker at −50°C. It was a completely clear solution. At 0 time, 22 ml. of chlorobutyl solution (containing 0.845 g. chlorobutyl) was introduced into the styrene charge at −50°C.) Soon haziness developed and after about 6 minutes of chlorobutyl addition the solution became cloudy. After 15 minutes, fluffy white polymer appeared. The reaction was terminated 41 minutes after chlorobutyl introduction. At this time, large amounts of polymer were visible. It was extracted with acetone and dried. The yield after drying, etc. was 1.7707 g. of pliable springy transparent film. Thus, this graft copolymer contained 0.845 g. chlorobutyl backbones and 0.925 g. polystyrene branches.

The thermal history of the product produced in Experiment (B) observed on a hot stage microscope, together with a control homopolystyrene was as follows:

| Temperature °C. | Graft Copolymer | Control |
|---|---|---|
| 65 | — | Starts to melt |
| 81 | Contours essentially unchanged | Contours gone |
| 88 | Substantially unmolten | Substantially molten |
| 104 | Substantially unmolten | Completely molten |
| 109 | Melts under pressure | Clear melt |
| 111 | Substantially unmolten without pressure | Clear melt |
| 122 | Starts to melt without pressure | Clear melt |
| 130 | Major melting, flows under pressure, not shape retaining | Clear melt |

Products obtained in these two experiments contain different amounts of styrene which explains their different physical appearance. The product obtained in Experiment (A) contains large amounts of styrene branches and is a brittle powder. The other obtained in Experiment (B) contains much less styrene branches and is a springy, pliable film.

Other monomers which can be used with chlorobutyl include isobutylene, butadiene, isoprene, piperylene, etc., vinyl ethers, benzyl chloride, and the like.

Other backbone polymers that can be used include polyvinyl chloride, poly-2-chloroethyl vinyl ether, etc. Final polymer properties would be determined by the two parent materials, i.e., backbone and branch, as well as by the relative concentration of the two parent components.

EXAMPLE 2

Grafting Styrene Onto Chlorobutyl Rubber

Commercially available chlorobutyl (visc. average mol. wt. 406,000, percent Cl = 1.21, I$_2$ number 9.1 corresponding to 1.34 mole percent unsaturation) was dissolved in dry n-pentane, precipitated into acetone, redissolved in n-heptane, reprecipitated into acetone and dried for about 3 hours in a vacuum oven at 60°C. Fifty g. of the cleaned material was dissolved in 450 ml. dry n-pentane (~10 percent solution) and cooled to −50°C. This solution was somewhat cloudy but it was pourable at −50°C.

In the meantime, a charge was prepared by mixing 100ml. of freshly distilled styrene with 900 ml. dry n-heptane at −50°C. in a 1 l. beaker equipped with stirrer and thermocouple. To this charge was added 2.6 ml. AlEt$_2$Cl. The whole operation was carried out in a stainless steel dry-box under a nitrogen atmosphere.

At 0 time 455 ml. chlorobutyl solution (or 45 g. chlorobutyl) was added into the charge under vigorous stirring. A 1°C temperature rise was observed on mixing of these solutions. After about 23 minutes of stirring at −50°C., the reaction mixture became noticeably thicker. After about 28 minutes a heavy gel mass filled the reactor and stirring became very difficult. The color of the reaction mixture turned gradually to orange. At this point, a few mls. of methanol and about 1 l. of acetone were added to the mixture and the system removed from the dry-box. The product was stirred and kneaded with 3 liters of acetone until it became snow white. The acetone was decanted and the product was washed by kneading with 1 l. of acetone 5 times. Finally, the acetone was filtered off and the acetone solutions discarded. The acetone insoluble product was extracted with hot methyl ethyl ketone (MEK) by stirring it in this solvent over night and filtering. Subsequently, the MEK soluble product was precipitated into acetone, filtered and dried. The process yielded 49.5 g. of white tough polymer.

The graft copolymer was analyzed as follows:
Solubility studies — The product was soluble in methyl ethyl ketone, n-heptane and toluene. This indicates grafting since chlorobutyl is insoluble in MEK and polystyrene is insoluble in n-heptane. The fact that the product dissolved in both of these solvents indicates the presence of a copolymer and that the soluble part of the copolymer "pulls into solution" the insoluble moiety. Toluene is a good solvent for both components. Solubility in this solvent was expected.

Differential Thermal Analysis — The DTA spectrum of the material shows the presence of butyl (second order transition point at −74°) and polystyrene (second order transition point at about +100°C.). This again indicates graft copolymerization.

Infrared Analysis — The infrared spectrum of the product was carefully analyzed. Comparison of this spectrum with those of pure components (a) chlorobutyl and (b) polystyrene indicated the presence of 59 wt. percent butyl and 41 wt. percent polystyrene in the graft.

Differential Refractometry — The composition of the graft copolymer was analyzed by differential refractometry. According to these results, the graft copolymer contained 39.7 wt. percent polystyrene and 60.3 wt. percent butyl species.

Nuclear Magnetic Resonance Analysis — The NMR spectra of the graft was analyzed by comparing it to spectra of pure chlorobutyl and homopolystyrene. This analysis indicated the presence of about 60 mole percent isobutylene and 40 mole percent styrene in the graft copolymer.

Elemental Analysis — The chlorine content of the graft copolymer was less than 0.2 percent. The original chlorobutyl backbone contained 1.21 percent Cl. This data indicates that grafting was quite extensive.

Physical Properties

Melting Properties on a Heat Stage Microscope

Visual observations were made as to the physical appearance of the polymer on a microscope equipped with a heated stage. The following record was obtained. Heating rate was about 4°C./min.

| Temperature, °C. | Observation |
| --- | --- |
| 25 | Compresses under pressure, rubbery. |
| 57 | Soft, recovers shape after pressure released. |
| 72 | Clear, recovers shape after pressure released. |
| 87 | Clear, recovers shape after pressure released. |
| 97 | Clear, recovers shape after pressure released. |
| 110 | Clear, recovers shape after pressure released. |
| 125 | Clear, flattens, does not return to original shape after pressure released. |
| 135 | Clear, flattens, does not return to original shape after pressure released. |
| 195 | Clear, liquid. |

Compression Molding — The graft polymer was milled on a small cold rubber mill and subsequently compression molded at 320°F. for 60 minutes in a rubber press. The following data were obtained on physical properties testing:

| Modulus, psi | | | | | Tensile, psi | Elongation, % |
| --- | --- | --- | --- | --- | --- | --- |
| 100% | 200% | 300% | 400% | 500% | | |
| 492 | 678 | 857 | 952 | 1190 | 1238 | 580 |

The compression molded test pieces were clear transparent products. All the products remained soluble in toluene after compression in the press.

Casting from Solvents — The graft polymer was dissolved in MEK, n-heptane and toluene and films were cast on a mercury surface. All these films were optically clear and tough.

Stress Relaxation — Rings were molded from the graft polymer and its stress relaxation was determined at 30°C. from 10 to 100 percent extension from 1 day to 2 weeks. Data show that the graft copolymer did not exhibit permanent set after 1 month of testing, i.e., it completely recovered its original length and shape. In contrast, uncrosslinked homopolyisobutene "flows apart" under identical testing conditions.

EXAMPLE 3

Grafting Styrene Onto Chlorobutyl Rubber

The purpose of this experiment was to prepare graft copolymer at −70°C. using a higher styrene/chlorobutyl ratio than previously.

Chlorobutyl was purified by dissolving and reprecipitation as described in Example 2. Then 23.04 g. of chlorobutyl was dissolved in 438 ml. of dry n-pentane (about 5 percent solution), cooled to −70°C. and introduced into a charge consisting of 100 ml. styrene, 900 ml. n-pentane and 1.3 ml. AlEt$_2$Cl at −70°C. under the general conditions described in Example 2. The temperature of the mixture rose by 1°C. upon mixing the ingredients.

After 10 minutes of stirring at −69°C. the content of the reactor started to thicken; after 12 minutes it was a very viscous system; after 17 minutes it was hardly possible to stir and a yellow color appeared. Significantly, after 20 minutes of stiriring the viscous system loosened up and after 22 minutes of stirring the pale yellow system became completely fluid. After 24 minutes the system started to thicken again and the color deepened to light orange. After 38 minutes of stirring, 2 ml. cold methanol was added and subsequently 400 ml. acetone was introduced.

A white slurry was obtained which was poured into 2 l. of acetone. The slurry was allowed to settle and the clear acetone was decanted, washed twice with 1 l. of acetone and decanted, then centrifuged and washed twice with acetone. Subsequently, the product was extracted with refluxing acetone under a N$_2$ atmosphere over night and filtered.

The acetone insoluble product was extracted with methyl ethyl ketone on the steam bath, filtered and precipitated with methanol, washed with acetone and dried. Yield 1.470 g. of white hard solid.

This product was analyzed as follows:

Solubility — clear solution in toluene, opalescent solutions in n-heptane and methyl ethyl ketone.

| Melting behavior (hot stage microscope): | 48°C. softens under pressure |
| --- | --- |
| | 70°C. starts to melt |
| | 100°C. largely melted |
| | 147°C. completely molten |

Infrared analysis — Comparison with pure chlorobutyl and polystyrene indicates the presence of 37.5 wt. percent chlorobutyl and 62.5 wt. percent of polystyrene.

NMR Analysis — Comparison with the pure components indicates 52 mole percent isobutylene and 48 mole percent styrene. Chlorine analysis shows less than 0.2 percent Cl.

EXAMPLES 4 to 6

Grafting Styrene Onto Chlorobutyl Rubber

The purpose of these three experiments was to see the effect of temperature on graft copolymer properties. Thus, grafting of styrene onto chlorobutyl was carried out at +11, −20 and −50°C. under essentially identical conditions.

A chlorobutyl (30 g.) solution in n-hexane (600 ml.) was prepared. The chlorobutyl was purified as described in Example 2. The chlorobutyl solution was divided into 3 parts and to each part was added 39 ml. (35.36 g. or 0.34 moles) styrene and 350 ml. n-hexane. Thus, in these 3 experiments the charge consisted of 10 g. chlorobutyl in 39 ml. styrene and 550 ml. n-hexane and to these charges was added at different temperatures the catalyst solution (0.43 ml. AlEt$_2$Cl in 10 ml. n-hexane).

The run at +11°C. — Upon addition of the catalyst, the clear reaction mixture became cloudy then milky and an orange color developed. The temperature rose to +29°C. for a short while. The reaction was terminated 33 minutes after catalyst introduction by the addition of 2 ml. methanol in 100 ml. acetone. After acetone extraction, centrifuging and drying the yield was 17.8 g. graft copolymer; a tough white material. The acetone soluble part was 21.7 g. (pure polystyrene).

The run at −20°C. — The solution turned orange on catalyst addition and the temperature rose to −4°C. for a short while. The reaction was terminated 30 minutes after catalyst introduction b by adding 2 ml. methanol and then 3 l. acetone. After acetone extraction, filtration and drying in a vacuum oven at 60°C., the yield was 18.4 g. graft copolymer, a tough transparent material. The combined acetone extracts yielded 27.80 g. acetone soluble product, (pure polystyrene).

The run at −50°C. — The system suddenly gelled 10 seconds after catalyst addition and turned orange. Stirring became almost impossible and the temperature rose to −38°C. The gel was broken up by working with a spatula and introducing 100 ml. n-hexane. The reaction was terminated 30 minutes after catalyst introduction by adding 2 ml. methanol and then 3 l. acetone. After acetone extraction, filtration and drying in a vacuum oven at 60°C. the yield was 17.5 g. graft copolymer. The acetone extracts yielded 26.56 g. pure homopolystyrene.

The following table summarizes analytical results obtained with these three runs:

| No. | Temp., °C. | Yield, g. (acetone insoluble) | Cl. wt.% | I.R. (wt.%) | N.M.R. (mole %) |
|---|---|---|---|---|---|
| 4 | +11 | 17.8 | 0.1 | 55.5 ClBu 44.5 pSt | 63 isobu 32 St |
| 5 | −20 | 18.4 | 0.1 | 55.5 ClBu 44.5 pSt | 59 isobu 38 St |
| 6 | −50 | 17.5 | 0.1 | 53.5 ClBu 46.5 pSt | 65 isobu 36 St |

EXAMPLE 7

Grafting Styrene Onto Chlorobutyl Rubber

The purpose of this experiment was to observe the effect of catalyst concentration on graft copolymer properties.

A charge was prepared consisting of 10 g. chlorobutyl (0.0034 moles Cl) in 200 ml. n-hexane, 39 ml. (35.36 g. = 0.034 moles) styrene and 350 ml. n-hexane and stirred at −50°C. To this solutions was added at −50° the catalyst solution 0.043 ml. (0.041 g.=0.00034 moles) AlEt$_2$Cl in 10 ml. n-hexane. After 138 minutes of stirring the reaction was terminated by introducing methanol and the product was extracted with 3 liters of acetone. However, chemical and spectroscopic analysis indicated that under these conditions, i.e., using a low catalyst concentration no substantial grafting had taken place. Thus, the acetone insoluble product had a molecular weight of 371,500 (original chlorobutyl 373,000), chlorine content of 1.14 wt. percent (original chlorobutyl 1.15 wt. percent) and iodine number 6.18 (original chlorobutyl 5.77). Infrared and NMR spectroscopy showed no evidence for polystyrene in the spectra of this product.

The acetone extract was evaporated. It was found that this extract contained only traces of a white polymeric product.

EXAMPLE 8

Grafting Styrene Onto Chlorobutyl Rubber

In this series of experiments on AlEt$_3$ catalyst was used for grafting. However, before the grafting experiment, several preliminary experiments were carried out to establish the activity of the catalyst, and the fact that AlEt$_3$ will not initiate a reaction unless in the presence of a co-catalyst.

A. In the first preliminary experiment, a solution was first prepared of 35.4 g (39 ml) styrene in 350 ml of carefully purified n-hexane and maintained at −50°C. From this solution a 10 ml aliquot was removed and 0.5 ml AlEt$_3$ was added to it at −50°C. No reaction occurred for 2 hours at this temperature. This experiment indicated the complete inactivity of AlEt$_3$ toward styrene.

The experiment was continued by introducing into the quiescent mixture slowly 0.3 ml tert.-butyl chloride, which is a powerful co-catalyst in conjunction with AlEt$_3$ as disclosed in U.S. Ser. No. 364,295. Shortly after co-catalyst introduction, the clear solution became hazy, then increasingly cloudy. Since polystyrene is insoluble in cold n-hexane the cloudiness in this experiment indicated that polystyrene formation and consequently it indicated the activation of AlEt$_3$ by the tert.-butyl chloride co-catalyst. An identical experiment was also carried out at −20°C. In these experiments a small molecule (tert.-butyl chloride) was used as a co-catalyst to initiate the polymerization of styrene. In the following experiment, a polymer molecule (chlorobutyl) was used as the co-catalyst to induce polymerization.

B. A charge was prepared of 50 ml styrene and 1 ml AlEt$_3$ and stirred at −20°C. in the dry box under nitrogen atmosphere. To this charge was introduced a prechilled 10 g. chlorobutyl in analysis: mol. wt: 373,000, 1.15 percent Cl, iodine number: 5.77.) Immediately the system became cloudy, then milky and the temperature rose sharply to +1°C. Stirring became difficult. Twenty minutes after the introduction of the chlorobutyl solution the reaction was terminated by introducing 2 ml methanol and 2 liters acetone. Subsequently, the product was exhaustively extracted with large amounts of acetone, filtered; the filtrate dissolved in toluene and reprecipitated into methanol. After drying in vacuo at 50°C., 17.1 g. of hard plastic product was obtained. Infrared analysis indicated that the graft copolymer consisted of 55 Wt. percent chlorobutyl and 45 percent polystyrene. Chlorine analysis of the sample indicated the presence of 0.58 wt. percent Cl and the iodine number was 4.88.

The acetone extracts were combined, evaporated and precipitated into methanol. A total of 22.8 g. of product was obtained which an infrared analysis was found to be pure polystyrene.

The acetone insoluble graft copolymer was compression molded and a clear, rubbery sheet was obtained. When this sheet is stretched opalescence appears which disappears when the stretching force is released and the film retracts to its original shape. A similar sheet was obtained by casting from toluene solution.

EXAMPLE 9

Grafting p-Chloro Styrene Onto Chlorobutyl Rubber

In this experiment, p-chloro styrene was grafted onto chlorobutyl. The purpose of the experiment was to change the second order transition temperature of the branch from +100°C. for polystyrene to +127°C. for poly-p-chlorostyrene.

24.54 g. of chlorobutyl (representing $6.05 \times 10^{-5}$ mole chlorobutyl or 0.0083 mole Cl) was dissolved (purification as in Example 2) in 181 ml dry n-pentane and 100 ml methylene chloride and the solution was thermoequilibrated at −50°C. The chlorobutyl molecular weight was 406,000, 1.21 wt. percent Cl, iodine number 9.1. The chlorobutyl solution was added to a charge consisting of 10 g. (0.072 moles) p-chlorostyrene, 3 ml (2.87 g. = 0.024 moles) AlEt$_2$Cl in 100 ml methylene chloride at −50°C. The temperature rose to −46°C. on catalyst addition and the reaction mixture turned yellow. 35 minutes after cocatalyst (i.e., chlorobutyl) solution introduction an aliquot of 100 ml of the reaction mixture was removed from the reactor. To terminate the reaction in this 100 ml sample this aliquot was introduced into a beaker containing 3 ml diethyl amine in 30 ml methyl chloride. The product was extracted with hot acetone, centrifuged washed with acetone, dissolved in toluene, centrifuged, reprecipitated into acetone, washed again with acetone, and dried in vacuum oven at 60°C. The yield was 7.168 g. graft copolymer; a white tough material. Infrared analysis indicated the presence of 74.5 wt. percent chlorobutyl and 25.5 wt. percent poly-p-chlorostyrene. NMR analysis showed about 82 mole percent isobutylene and 14 mole percent p-chlorostyrene. The acetone soluble portion, 0.149 g., pure chloropoly-p-chlorostyrene.

The remaining solution in the reactor was stirred at −50°C. for a total of 165 mins. after cocatalyst introduction. Then the reaction was terminated by introducing a diethyl amine in methylene chloride solution, extracted with acetone and worked up as described above. The yield of acetone insoluble graft copolymer was 19.164 g.; a tough white material. Infrared analysis indicated the presence of 75.0 wt. percent chlorobutyl and 25 wt. percent poly-p-chlorostyrene. NMR spectra showed about 88 mole percent isobutylene and 12 mole percent p-chlorostyrene. The acetone soluble portion was 0.505 g. homopoly-p-chlorostyrene.

These data indicate that under these conditions p-chlorostyrene can be grafted onto chlorobutyl and that continued stirring did not increase the efficiency of the grafting reaction. Apparently, grafting is a rather fast reaction and is completed in less than 35 minutes. s These results also show that the amount of homo poly-p-chlorostyrene formed under these conditions is very low (0.654 g.) as compared to the total graft copolymer obtained (26.332 g.)

The graft copolymers were dissolved in toluene and films were cast. These films are optically clear, flexible and strong.

EXAMPLE 10

Grafting α-Methyl Styrene Onto Chlorobutyl Rubber

The purpose of this run was to prepare a graft copolymer with poly-α-methyl styrene branches on a chlorobutyl backbone. The second order transition temperature of poly-α-methyl styrene is +170°C., that of chlorobutyl is about −74°C.

The backbone polymer solution was prepared by dissolving 15 g. chlorobutyl (commercial product HT 1066, purification described in Example 2) in 250 ml dry n-hexane and cooling to −50°C. This solution was added to a charge consisting of 63 ml (57.3g.) freshly distilled α-methyl styrene in 250 ml n-hexane and 0.61 ml AlEt$_2$Cl at −50°C. Upon polymer introduction the system immediately thickened considerably, stirring became extremely difficult, and the color turned orange. Stirring was impossible after 4 mins. of polymer addition. Consequently, the reaction was terminated by introducing 100 ml. methanol. Subsequently, the product was kneaded in 2 l. methanol, filtered and dried in a vacuum oven at 60°C. Yield 63.7 g. white powder. Acetone extraction removed 6.74 g. of material. The acetone extracted material, 56.5 g., was completely soluble in methylene chloride and mostly soluble in dioxane. Since pure chlorobutyl is largely insoluble in methylene chloride and is completely insoluble in dioxane and poly-α-methyl styrene is readily soluble in these two solvents, the acetone extracted product is a graft copolymer. The graft copolymer was dissolved in toluene and films were cast. These films were slightly hazy and brittle.

EXAMPLE 11

Grafting Styrene Onto Chlorinated Ethylene Propylene Rubber

The purpose of this run was to demonstrate the grafting with a chlorinated EP rubber backbone. The chlorines in EP rubber are probably in the tertiary position in the chain:

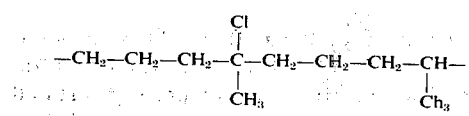

Therefore, it appeared to be possible to graft the cationically initiable styrene monomer onto this chain using the AlEt$_2$Cl catalyst.

4 g. chlorinated EP rubber was dissolved (3.85 percent Cl) in 50 ml n-hexane. (This solution represented $5.9 \times 10^{-6}$ moles polymer or 0.004 moles chlorine). To this solution was added 35 ml (31.7 g = 0.305 moles) styrene and 125 ml n-hexane and cooled to −46°C. This solution was quite viscous at this temperature level but it could be stirred readily.

At 0 time was added the catalyst solution 0.5 ml (0.48g = 0.004 mole) AlEt$_2$Cl in 10 ml n-hexane to the stirred system at −46°C. The reaction mixture became gradually more viscous and opalescent. After 33 mins.

of stirring the reaction was terminated by introducing about 100 ml toluene containing a few mls of methanol. To the viscous liquid system was added about 1 l. acetone and a rubbery white mass was obtained. The rubbery product was removed from the acetone, squeezed dry and dissolved in toluene. Some toluene insoluble material was centrifuged off (0.106 g). The toluene solution was precipitated into methanol, dried in a vacuum oven at 60°C. Yield 5.66 g graft copolymer. The acetone soluble extract contained 28.03 g solid homo polystyrene.

The toluene soluble material is a white very tough plastic. This is a graft copolymer as indicated by infrared spectroscopy, i.e., infrared shows 33 wt. percent ethylene-propylene copolymer and 67 wt. percent polystyrene.

The graft copolymer was dissolved in toluene and a film was cast on a mercury surface. This film was clear, transparent, pliable, and strong. The product was compression molded to clear transparent tough films.

EXAMPLE 12

Grafting Styrene Onto Polyvinyl chloride

The purpose of this experiment was to investigate the feasibility of grafting polystyrene branches onto a polyvinylchloride (PVC) backbone.

23.73 of PVC (Geon 103) was dissolved in 1200 ml (BaO dried and distilled) o-chlorotoluene (2 percent solution) and the solution was cooled to −30°C. This solution was introduced at −30° into a charge consisting of 100 ml styrene and 2.25 ml AlEt$_2$Cl under vigorous stirring. The temperature rose to −27°C. and the system became yellow. The reaction was terminated 46 mins. after cocatalyst (PVC) addition by introducing a few mls of methanol and then transferring the whole system into 6 l. of methanol. The white precipitate was settled over night, filtered, washed with methanol, and then with n-pentane to remove last traces of o-chlorotoluene. Yield 44.15 g white powder.

Since PVC is insoluble in cyclohexane whereas polystyrene (PS) is readily soluble in this solvent, the product was extracted with 1,800 ml refluxing cyclohexane for 1 hour and then stirred for 3 days at ambient temperature. Then it was filtered, washed with cyclohexane, and dried in vacuo at 60°C. Yield 25.14 g graft copolymer, a white powder.

The cyclohexane soluble part was recovered by precipitating into methanol. Yield 11.48 g pure homopolystyrene.

The cyclohexane insoluble graft copolymer contains 92.7 wt. percent PVC and 7.3 wt. percent PS by infrared analysis. This material was compression pressed and a homogeneous, clear, transparent, and pliable film was obtained.

Elemental analysis of the graft copolymer gave 43.84 percent C., 5.36 percent H and 50.55 percent Cl. PVC (Geon 103) gave 38.67 percent C, 4.85 percent H and 55.93 percent Cl.

When a physical mixture was prepared from 93 percent PVC (Geon 103) and 7 percent cationically polymerized polystyrene and the physical mixture was compression pressed, a hazy, heterogeneous film was obtained.

EXAMPLE 13

Preparation of Graft Polymer with Polyvinyl Chloride Backbone with Polyisobutylene Branches 10 g of polyvinyl chloride (commercially available Vinylchlon 3000-35H (4000)) was dissolved in 900 ml 1,2-dichloroethane under gentle refluxing. The solution was cooled to −30°C. and at this temperature 95 ml isobutene monomer was gradually added to it until the initially completely homogeneous system became faintly hazy (maximum amount of isobutene in the system under these particular conditions). To this system at −30°C. was added the catalyst solution prepared by diluting 2 ml AlEt$_2$Cl with 9 ml 1,2-dichloroethane. Grafting commenced instantaneously on catalyst introduction and was noticeable by a rise in temperature (T = 10°) and by milkiness developing in the reactor. About 13 mins. after catalyst introduction 2 ml methanol was added to the reactor to quench the reaction and the content of the reactor was transferred into 2-½ l. of n-pentane. The slurry was allowed to settle overnight. At this point, the system was centrifuged, the pasty product washed thrice with n-pentane and centrifuged again. Finally, the product was dried in vacuo at 50°C. Yield 12.538 g of white powdery material (graft).

The pentane solutions were combined (about 4,000 ml), concentrated by evaporation of the solvent on a steam bath to about 500 ml and precipitated into a large amount of methanol. This pentane soluble fraction was then collected and dried in vacuo at 50°C. and 55.4 g of rubbery polymer was obtained polyisobutylene (PIB).

The graft polymer was placed into 400 ml tetrahydrofuran (a solvent for PVC). A slightly hazy solution was obtained. This solution was heated (reflux) on a steam bath overnight and precipitated into 6 l. of methanol. The fluffy precipitate was filtered, dried in vacuo at 50°C. and 11.0 g white powdery product was obtained.

Concurrently with the graft polymerization the following control runs were carried out.

Control I—1 ml 1,2-dichloroethane and 0.6 ml AlEt$_2$Cl were mixed at −30°C. To this mixture 1 ml isobutene was added. No polymerization occurred even after 30 mins. standing at this temperature.

Control II—1 ml isobutene and 0.6 ml AlEt$_2$Cl were mixed at −30°C. then 1 ml 1,2-dichloroethane was added to the solution. The system remained clear and no polymerization occurred even after 30 mins.

Control III—To 5 ml solution of PVC in 1,2-dichloroethane (as prepared above) was added 0.6 ml AlEt$_2$Cl, but the system remained unchanged (homogeneous solution) even after 30 mins.

Characterization of the Graft Copolymer

Infrared Analysis—The infrared analysis of the graft copolymer indicated the presence of 6.5 wt. percent polyisobutylene branches and 93.5 wt. percent polyvinylchloride backbone (in the pentane insoluble fraction).

Elemental Analysis—Chlorine analysis of the graft copolymer showed 43.29 percent Cl down from 56.8 wt. percent Cl in pure PVC indicating that a large amount of grafting has taken place.

Solubility Studies—The graft copolymer was studied in various hot solvents:

| Non-Solvents: | |
|---|---|
| CS$_2$: | swells, cloudy gel |
| CCl$_4$: | slight swelling |
| CHCl$_3$: | fluffy gel |
| Toluene: | swells, cloudy gel |

-Continued

Solvents:
| | | |
|---|---|---|
| | THF: | mostly soluble, hazy solution |
| | Benzaldehyde: | soluble, clear |
| | Acetophenone: | soluble, clear |
| | 1,2-Ethylene dichloride: | soluble |

Melting Behavior—The graft copolymer and some PVC were placed side-by-side on a microscope cover glass and their melting behavior was noted on a hot stage microscope as follows:

| Temp. | Observations Graft | Observations PVC |
|---|---|---|
| 110° | softens | softens |
| 132 | compresses | compresses |
| 165 | further softening | further softening |
| 178 | further softening | clear spots showing |
| 191 | becoming plastic | becoming plastic |
| 195 | plastic but still shows dark areas | melted, clear |

Pliability Studies—About 5 g of the graft copolymer was compression pressed (about 6,000 lb./inch² at 390°F. for 30 sec.) and a pliable strong film was obtained. The film could be bent around a cylindrical pencil without breaking.

A film obtained from pure PVC under the same conditions was brittle and could not be wrapped around a pencil without crumbling and breaking.

EXAMPLE 14

In this experiment 45 g. PVC (Geon 103) was dissolved under heating in 3,000 ml 1,2-dichloroethane and the solution cooled to −30°C. Subsequently, 50 ml isobutylene was added to the solution at −30°C. which became slightly hazy. The following is a time log of the experiment:

| Time | Action |
|---|---|
| 0 mins. | Catalyst introduced. The catalyst is 2 ml AlEt₂Cl in 10 ml 1,2-dichloroethane. |
| 8 | Reactor content hazy, temperature −29°C. |
| 48 | Catalyst introduction continued: 4 ml AlEt₂Cl in 10 ml 1,2-dichloroethane. |
| 56 | Catalyst introduction continued: 3.3 ml AlEt₂Cl in 10 ml 1,2-dichloroethane. |
| 63 | Catalyst introduction continued: 1.1 ml AlEt₂Cl in 5 ml 1,2-dichloroethane. |
| 76 | Catalyst introduction continued: 4 ml AlEt₂Cl in 10 ml 1,2-dichloroethane. |
| 128 | Catalyst introduction continued: 4 ml AlEt₂Cl in 10 ml 1,2-dichloroethane. |
| 153 | Reaction terminated by introducing 10 ml methanol, then the whole mixture was poured into about 8 l. methanol. White fluffy precipitate forms and settled overnight. The precipitate was filtered, transferred into a 5 l. flask and n-pentane was added (~ 4000 ml). The precipitate was refluxed with n-pentane for 3 hrs., cooled off, allowed to settle, the pentane decanted off and fresh pentane was added to the insoluble precipitate which was then again refluxed for ~ 2 hours. This pentane extraction was repeated once more at which point a test showed that the pentane did not contain any soluble material (i.e., when the pentane solution was added to methanol it remained clear). The product was then filtered, dried in vacuo overnight and weighed: 47.1 g white, static powder. |

Pentane soluble fraction recovered by precipitation in methanol and drying in vacuo: 5.754 g.

Characterization of Graft Polymer

Infrared Analysis—Indicated 11 wt. percent polyisobutylene branches and 89 wt. percent PVC backbones present in the graft polymer (pentane insoluble fraction).

Elemental Analysis—Chlorine analysis of the graft copolymer shows 48.02 percent Cl against 55.93 percent Cl in the PVC used as the backbone.

Solubility Studies—As with Example 1.

Melting Behavior—As with Example 1.

| Temp., °C. | Observations Graft | PVC |
|---|---|---|
| 96°F. | slightly compressed | unchanged |
| 105 | compresses | softens |
| 112 | starts to melt | compresses |
| 120 | melting | compresses |
| 145 | melting, clear | compresses, clear in the middle |
| 180 | soft plastic | compresses, clear |

Pliability Studies—As in Example 13. The graft copolymer gave a clear pliable film which could be easily wrapped around a pencil.

Tensile Impact—Test method: ASTM No. D 1822-61T. Sample preparation: 20 g resin mixed with 0.8 g Thermolite 31 stabilizer (i.e., 4 percent stabilizer in resin) and compression molded pads at 370°F. for ~30–60 seconds with ~7,000 lb./inch² pressure.

| | Graft: | PVC (Geon 103): |
|---|---|---|
| Tensile impact (Ft.-lbs./inch²): | 160 (aver. of 3) | 150 (aver. of 4) |

Importantly the surface of the cut of the graft was ragged and "blushed" — the neck was strongly elongated — in comparison the PVC showed a clean cut and no "blushing."

Flexural Stiffness—ASTM (Stiffness of Plastics by Cantilever Beam) D747-63.

Resin compound (in g)—(Compression molded pads as in Tensile Impact Test)

| | I | II | III | IV | V | VI |
|---|---|---|---|---|---|---|
| Graft | 10 | — | 10 | — | — | — |
| Geon 103 | — | 10 | — | 10 | 10 | 10 |
| Thermolite 31* | 0.4 | 0.4 | 0.4 | 0.4 | 0.4 | 0.4 |
| Dioctylphthalate | — | — | — | — | 1.5 | 2.5 |
| Stearic Acid | — | — | 0.05 | 0.05 | 0.05 | 0.05 |
| Stiffness in Flexure (10⁵) (psi) | 2.07 | 2.76 | 1.83 | 2.71 | 1.84 | 1.83 |

*Organo-tin stabilizer made by M&T Chemicals, Inc.

These novel graft polymers are useful materials in more than one respect and represent substantial improvements above existing products. Some useful applications are: internally plasticized PVC-s, i.e., PVC from which the plasticizer cannot ooze out, pliable films, tough molding compounds, thermoplastics. Another fruitful application is in poly-blending: Polyvinyl dichloride can be blended with polyisobutylene using the graft polymer as a phase soluble in or compatible with both components.

EXAMPLE 15

Grafting Isobutylene Onto Polyvinyl Chloride

For comparison purposes there was prepared a physical mixture of polyvinyl chloride (PVC) and polyisobutene (PIB). The polyvinyl chloride used in these studies was the same as that used in the grafting experiment, i.e., Vinylchlon and Geon 103. The homopolyisobutenes were obtained from the pentane extracts of the above grafting experiments and consequently were for all practical purposes identical to the polyisobutene grafted onto the PVC. Both polymers, PVC and PIB were dissolved in a common solvent, e.g., chlorobenzene, and coprecipitated into methanol. The relative amounts of these two polymers in the common solvent were 89 percent PVC and 11 percent PIB to correspond with the relative amounts in the graft copolymer as determined by infrared analysis. This coprecipitate represents an intimate physical mixture of these two materials.

The physical mixture of PVC-PIB was compression molded. A badly discolored, heterogeneous completely unacceptable product was obtained.

Under identical conditions the graft copolymer of 89 percent PVC/11 percent PIB gave optically clear, transparent, pliable, homogeneous films.

EXAMPLE 16

In this example a series of runs was carried out in which AlEtCl$_2$ catalyst was used. The purpose of this experiment was to distinguish between AlEtCl$_2$ catalyst, which is a borderline representative of the conventional Friedel-Crafts type catalyst which does not require the extraneous and purposeful addition of a cocatalyst to acquire polymerization activity, and the catalysts of the invention. AlEtCl$_2$ and similar catalysts, e.g., AlCl$_3$, SnCl$_4$, BF$_3$, TiCl$_4$, etc. when contacted with styrene, isobutene and other cationically initiable monomers under ordinary low temperature conditions immediately initiate the polymerization of these monomers and do not need extraneous cocatalysts introduction.

A few polymerization runs were carried out with AlElCl$_2$ under conditions identical to those used in Example 2 except AlEtCl$_2$ was used in place of AlEt$_2$Cl. In Example 2, the introduction sequence of components were: 1. monomer (i.e., styrene), 2. catalyst (i.e., AlEt$_2$Cl) and 3. cocatalyst (i.e., chlorobutyl). When this experiment was carried out with AlEtCl$_2$ and the AlEtCl$_2$ was introduced into the styrene charge at −50°C. immediate and vigorous polymerization occurred and large amounts of polystyrene formed. It was useless to add to this system the chlorobutyl solution because the styrene monomer had already been largely consumed in the homopolymerization reaction. Consequently, this system only yielded a mixture of two homopolymers, homopolystyrene and unchanged chlorobutyl.

In another run with AlEtCl$_2$ the styrene and chlorobutyl were mixed in a common solvent and to this solution the AlEtCl$_2$ catalyst was added. Thus, 3.5 g styrene in 350 ml n-hexane and 10 g chlorobutyl in 200 ml n-hexane were mixed and equilibrated at −50°C. Then 0.35 ml AlEtCl$_2$ catalyst in 10 ml n-hexane was introduced gradually. Immediately polymerization started and the temperature rose to −46.5°C. After 30 minutes of stirring the reaction was terminated with a small amount of methanol, and the reaction mixture was exhaustively extracted with acetone. The acetone extracts gave 21.3 g product which on infrared analysis was found to be pure homopolystyrene, having a number average molecular weight of 4,188. The acetone insoluble material was extracted with toluene yielding 8.7 g toluene soluble and 7.4 g toluene insoluble crosslinked gel. Both the toluene soluble and insoluble materials contained chlorobutyl and polystyrene species separately.

The toluene soluble fraction (8.2 g) was a white powdery product which on compression molding under the conditions described in Example 2 resulted in strongly hazy and very brittle films which tenaciously adhered to the aluminum foil used in the mold of the press. Due to the brittleness of the sample, it was impossible to handle it without breaking and no physical testing could be carried out. The haze and cloudiness of the films were a distinct indication of an inhomogeneous material, i.e., individual and separate homopolystyrene and chlorobutyl species in the product.

In an effort to improve the physical properties of this product, the toluene soluble fraction was separated into two fractions by extraction with methyl ethyl ketone. Both the methyl ethyl ketone soluble (3.85 g) and insoluble (4.01 g) fractions were white powders which on compression molding again gave brittle and hazy films strongly adhering to the aluminum foil.

The melting properties of the toluene and methyl ethyl ketone soluble fraction were investigated on a hot stage microscope. The following observations were made:

| Temperature, °C. | Observations |
| --- | --- |
| 76 | Part slightly compresses under pressure |
| 82 | Partly compresses under pressure |
| 95 | Most compresses under pressure |
| 103 | Compression progressing under pressure |
| 111 | Softer, still dark on edges |
| 115 | Plastic, still dark on edges |
| 130 | Soft plastic, clear throughout |
| 137 | Flows under pressure |

The toluene soluble, methyl ethyl ketone insoluble fraction (4.01 g) was a white powder. On compression molding, hazy and brittle films were obtained whose physical properties were completely unacceptable.

The toluene insoluble fraction (7.4 g) was also a powdery material. Compression molding attempts failed and cloudy, inhomogeneous brittle films were obtained.

These experiments demonstrate that none of the fractions obtained from polymers prepared with AlEtCl$_2$ catalyst containing polystyrene and chlorobutyl gives acceptable physical properties.

A similar series of experiments were carried out with AlCl$_3$ catalyst. If the sequence of introduction of components is: 1. monomer, 2. catalyst and 3. cocatalyst, the monomer immediately polymerizes on AlCl$_3$ catalyst addition and homopolymer (i.e., homopolystyrene) is formed.

Thus, the experiment with AlCl$_3$ can be only carried out by introducing the catalyst last which severely limits the flexibility of the process. In addition, the physical properties of the products obtained in this manner with AlCl$_3$ were completely unsatisfactory and unacceptable.

Another factor which severely limits the scope of the process with $AlCl_3$ is due to the insolubility of $AlCl_3$ in hydrocarbon solvents. In other words, the $AlCl_3$ must be dissolved in methyl chloride or ethyl chloride, etc. to render it usable at all.

However, in contrast to hydrocarbon solvents which readily dissolve chlorobutyl, chlorobutyl is largely insoluble in methyl chloride; is sparingly soluble in ethyl chloride, which fact again strongly limits the applicability of the process with $AlCl_3$.

Keeping in mind the above limitation, reaction conditions were worked out to establish the most favorable conditions for a polymerization trial using $AlCl_3$ as the catalyst.

A charge consisting of 39 ml (35.4 g) of styrene in 350 ml ethyl chloride and 10 g chlorobutyl in 200 ml ethyl chloride was mixed and stirred at $-11°C$. The temperature could not be lowered below $-11°C$ because of the insolubility of chlorobutyl in the system. The catalyst solution was 11 ml of a 4 percent $AlCl_3$ solution in ethyl chloride (containing 0.45 g or $3.4 \times 10^{-3}$ mole dissolved $AlCl_3$). The reaction was started by adding the $AlCl_3$ solution to the charge. The temperature rose to $-2°C$. indicating the onset of the polymerization of styrene. After 30 minutes of stirring the reaction was terminated by the introduction of methanol. The product was extracted with acetone, precipitated into methanol, filtered and dried. Acetone removed 17.2 g product, which was substantially pure polystyrene, having a molecular weight of 4,383. The acetone insoluble product was dissolved in toluene. Most of the product dissolved in toluene (only 0.462 g toluene insoluble gel was recovered) and the toluene soluble fraction was found to be soluble in methyl ethyl ketone also.

The latter fraction was a powdery, off white product. Its melting properties were investigated on a hot stage microscope. The following observations were made:

| Temperature, °C. | Observations |
| --- | --- |
| 100 | Compresses under pressure |
| 102 | Clearing, softening |
| 107 | Clear when compressed |
| 110 | Soft plastic |
| 119 | Clear soft plastic, does not flow |
| 130 | Clear soft plastic, does not flow |
| 140 | Very soft plastic |
| 148 | Liquid |

Attempts were made to compression mold the methyl ethyl ketone and toluene soluble product, however, only very brittle and hazy films and pads were obtained which strongly adhered to the aluminum foil. The physical peoperties of these specimens could not be determined because of the extreme brittleness of the materials.

EXAMPLE 17

Grafting Isobutylene Onto Neoprene

The purpose of this experiment was to graft isobutylene onto neoprene (polychloroprene). To 20 ml isobutene at $-10°C$. there was added 0.25 ml (10 drops, 0.002 moles) $AlEt_2Cl$. As expected, no reaction occurred. After 6 minutes of agitation at $-10°$ there was introduced 0.473 g neoprene in 10 ml chlorobenzene (5 percent neoprene in chlorobenzene) solution. The system immediately turned yellow and the temperature increased to $+20°C$. The isobutene started to boil for a short while. Twenty minutes after the neoprene addition, the reaction was terminated by introducing methanol. The white, rubbery product was washed with methanol and dried in a vacuum oven at 50°C. Yield 5.955 g. The product was extracted with 200 ml refluxing n-pentane for 24 hrs., centrifuged, washed with n-pentane. Neoprene is insoluble in n-pentane, whereas polyisobutene is readily soluble in this solvent. The result was: pentane insoluble fraction 0.580 g; pentane soluble fraction, after precipitation in methanol, drying, etc., 5.282 g. Both fractions were analyzed by infrared spectroscopy. The pentane insoluble fraction showed 60 wt. percent neoprene and 40 wt. percent polyisobutene whereas the pentane soluble fraction shows 7 wt. percent neoprene and 93 wt. percent polyisobutene. These data show that extensive grafting occurred and that a small amount of neoprene rich (polyisobutylene poor) and a relatively large amount of neoprene poor (polyisobutylene rich) graft copolymer was obtained.

EXAMPLE 18

Grafting Isobutene Onto Neoprene

In this experiment 5 ml isobutene and 10 ml chlorobenzene were stirred in the presence of 0.1 ml (0.0008 mole) $AlEt_2Cl$ at $-50°C$. To this quiescent solution 0.166 g neoprene in 10 ml chlorobenzene (1.66 percent neoprene) solution was added. Immediately after the mixing of these components the temperature of the system started to rise until it reached $-10°C$.; yellow color developed, and the viscosity started to increase. About 11 minutes later, the reaction was terminated by introducing cold methanol containing a small amount of $\beta$-phenyl naphthylamine stabilizer. The product was dissolved in chlorobenzene and reprecipitated into methanol. A portion of the methanol insoluble product was extracted with refluxing n-pentane and 0.792 g white, rubbery material was obtained which on infrared analysis showed 9 wt. percent neoprene and 91 wt. percent polyisobutene. The other portion of the methanol insoluble product 2.377 g was not extracted with pentane; it was only washed several times with methanol. The latter product was also analyzed by infrared spectroscopy which showed the presence of 7 wt. percent neoprene and 93 wt. percent polyisobutylene. This experiment showed that when the grafting is carried out at relatively low temperatures, an essentially homogeneous soluble graft copolymer is obtained which consists of ~8 percent neoprene backbone and ~92 percent polyisobutene branches.

EXAMPLE 19

Grafting Isobutylene Onto Neoprene

In this experiment 150 ml isobutene in 300 ml ethyl chloride solution was stirred in the presence of 3 ml (2.87 g or 0.23 mole) $AlEt_2Cl$ catalyst at $-78°C$. To this system a 4.2 g neoprene in 600 ml ethyl chloride solution was introduced at $-78°C$. After 15 minutes of stirring, the temperature slowly rose to $-77°C$. and after another 33 minutes, it rose to $-76°C$. After 37 minutes of stirring the content of the reactor suddenly became rather viscous and the temperature rose to $-74°C$. At this point the reaction was terminated by introducing chilled methanol containing $\beta$-phenyl naphthylamine, and the product was transferred into 1 of n-pentane. After exhaustive extraction in 1.5 l pentane, filtration from a small amount of ash (0.135 g), precipitation into methanol containing β-phenyl naphthylamine and drying in a vacuum oven at 50°C. yield was 30.5 white, rubbery product. Infrared analysis indicated 6 wt. percent neoprene backbones and 94 wt. percent polyisobutene branches. Differential refractometry confirmed this analysis showing 5.5 wt. percent neoprene and 94.5 wt. percent polyisobutene.

This graft copolymer was subsequently cured using the following recipe (in parts): product 100, stearic acid 0.5, phenyl - α-naphthylamine 2.0, MgO 2.0, ZnO 5.0 and 2-mercapto imidazoline 0.5. The blends were compounded on a cold mill and cured for 20 and 60 minutes at 307°F. to give satisfactorily cured pads.

EXAMPLE 20

Grafting Butyl Rubber Onto Neoprene

These experiments demonstrate that a copolymer branch can be grafted onto a backbone polymer. Thus, butyl rubber, a copolymer of isobutylene and isoprene was grafted onto neoprene.

A charge was prepared consisting of 142.5 ml isobutylene and 7.5 ml isoprene in 300 ml ethyl chloride and 3 ml (2.87 g or 0.23 mole) $AlEt_2Cl$ catalyst and stirred at −78°C. in the dry box under nitrogen atmosphere. The cocatalyst solution was 5 g Neoprene WRT (commercial product, thrice dissolved in chloroform and reprecipitated into methanol) dissolved in 720 ml ethyl chloride. The grafting reaction was started by introducing 600 ml precooled neoprene "cocatalyst" solution (containing 4.2 neoprene) into the quiescent charge at −78°C. The system became cloudy immediately upon the introduction of neoprene solution and the temperature rose to −76°C. The reaction was terminated 76 minutes after neoprene solution addition by introducing 20 ml methanol containing a small amount (about 0.1 g) of β-phenyl naphthylamine stabilizer. During the course of the reaction, several small aliquot samples were withdrawn to constantly check the solubility of the product. After termination with methanol the product was poured into a 5 l vessel and contacted with a mixture of 1500 ml n-pentane and 1500 ml n-heptane. A cloudy solution was obtained. Filtration was attempted but the cloudy solution went through the filter paper. The solubility of this cloudy solution was tested by dissolving a 10 ml aliquot in a small amount of toluene. A clear solution was obtained. These facts indicate that the neoprene which per se is completely insoluble in normal aliphatic hydrocarbons, e.g., n-pentane or n-heptane, was solubilized by the pentane soluble butyl chains attached to it. When the cloudy graft solution was contacted with toluene, which is a good solvent for both components, i.e., neoprene and butyl, a clear system was obtained.

Then the entire cloudy graft solution was reprecipitated into ~9000 ml acetone, let settle, decanted, washed with acetone, collected, and dried in a vacuum oven at 50°C. Weight: 36.5 g rubbery product. Repeated solubility tests show that the rubber was soluble in ortho chloro toluene, toluene and gave a cloudy solution in n-heptane indicating the presence of graft copolymer.

The following control experiments as correlaries to Example 20 were carried out:

A. Butyl control. When 3 ml of a feed containing 2.43 ml isobutylene and 0.67 ml isoprene was stirred in 18 ml ethyl chloride in the presence of 0.06 ml $AlEt_2Cl$ at −78°C. no reaction occurred even after 2 hours of stirring at this temperature. This control experiment indicates that the $AlEt_2Cl$ catalyst alone is inactive.

B. Neoprene control. 12 ml Neoprene solution in ethyl chloride containing 0.0835 g. neoprene was diluted with 9 more ml of ethyl chloride solvent and stirred in the presence of 0.06 ml $AlEt_2Cl$. No crosslinking, i.e., gelation occurred even after 2 hours at −78°C. However, gelation occurred in the presence of $AlEtCl_2$.

EXAMPLE 21

Grafting Styrene Onto Neoprene

This example and example 22 show that graft copolymers can be obtained with polystyrene branches on neoprene backbones.

A charge was prepared of 5 ml styrene in 15 ml ethyl chloride and stirred in the presence of 0.1 ml (0.096 g or 0.0008 mole) $AlEt_2Cl$ at −50°C. The grafting reaction was started by introducing a precooled solution of 0.125 g neoprene in 20 ml ethyl chloride. Immediately upon contacting the solutions the content of the reactor started to get more viscous and the temperature started to climb until after 3 minutes it reached −30°C. At this point, the reaction was terminated by introducing 500 mls of methanol. A white polymer settled out. The product was soluble in toluene and methyl ethyl ketone. The methanol was decanted and the product was extracted with acetone and washed with acetone. The acetone soluble fraction was 0.149 g white, powdery product, homopolystyrene. The rest of the product 3.124 g was completely soluble in methyl ethyl ketone.

Since neoprene is insoluble in methyl ethyl ketone (whereas polystyrene is readily soluble in this solvent) this solubility characteristic indicates the presence of a graft copolymer.

EXAMPLE 22

Grafting Styrene Onto Neoprene

Example 21 was repeated with larger amounts of materials. Thus, a charge of 55 ml (50 g) styrene in 200 ml ethyl chloride and 0.5 ml (0.48 g or 0.004 mole) $AlEt_2Cl$ catalyst was stirred at −50°C. A grafting reaction was initiated by introducing a solution of 5 g neoprene in 200 ml ethyl chloride. Immediately after the introduction of the latter solution, the temperature rose to −36°C. and the content of the reactor became very viscous. The reaction was terminated by introducing a few mls of methanol containing 0.1 g β-phenyl naphthylamine stabilizer and then pouring the entire mixture into 2000 ml acetone. Acetone extraction yielded 8.924 g white powder which was homopolystyrene. The rest was dissolved in 700 ml methyl ethyl ketone, centrifuged from some insoluble material, precipitated in methanol and dried; 29.2 g fluffy, solid product was recovered. The methyl ethyl ketone insoluble centrifuged product was dissolved in chlorobenzene, precipitated into methanol and dried: 9.6 g of product was obtained.

EXAMPLE 23

Grafting Chloroprene Onto Chlorobutyl Rubber

In this and subsequent experiments, chloroprene was grafted onto chlorobutyl backbones. A charge was prepared of 1.5 ml freshly distilled chloroprene (2-chloro-1,3-butadiene) in 50 ml n-hexane and stirred in the presence of 0.17 ml (0.15 g or 0.0012 moles) $AlEt_2Cl$ catalyst at −10°C. To start the reaction, a solution of 2.52 g chlorobutyl in 45 ml n-hexane at −10°C. was added to this quiescent system. Upon introduction of the chlorobutyl solution the system turned yellow and the color deepened in the course of the reaction. After 257 minutes of stirring, the reaction was terminated by introducing methanol containing β-phenyl naphthylamine stabilizer. The graft copolymer was recovered from the methanol and dried in a vacuum oven at 40°C. The product, 2.711 g white, rubbery material was completely soluble in toluene.

EXAMPLE 24

Grafting Chloroprene Onto Chlorobutyl Rubber

In this experiment, a solution of 7.2 g chloroprene in 50 ml n-hexane was stirred in the presence of 0.33 ml (0.32 g or 0.0025 moles) AlEt$_2$Cl catalyst at −50°C. To this system a solution of 7.2 g chlorobutyl in 150 ml n-hexane solution was added to initiate reaction. The system became yellow. The reaction was terminated 31 minutes after chlorobutyl solution addition. In the course of the reaction, numerous samples were withdrawn to check the solubility of the system and for other purposes. Thus, after working with methanol and drying, only 6.590 g of a rubbery product was recovered. Of this product 5.576 g was extracted with 250 ml n-hexane by stirring for 60 hours. The hexane soluble fraction was precipitated into methanol, dried in a vacuum oven at 50°C. and weighed: 5.394 g white, rubbery product was recovered and analyzed for chlorine. Chlorine analysis indicated the presence of 2.70 wt. percent Cl. This indicates the presence of grafting since polychloroprene is insoluble in n-hexane, nevertheless the hexane soluble fraction recovered contained more chlorine than the chlorobutyl backbone used to initiate the graft copolymerization. Chlorine analysis of the original chlorobutyl indicated 1.15 wt. percent Cl. Thus, the difference, 1.55 wt. percent Cl, was due to polychloroprene branches in the product. Monomeric chloroprene could not be entrapped in the rubber because it was recovered by reprecipitation into methanol and dried in a vacuum oven at 50°C. The boiling point of chloroprene monomer is very low (59.4°C.)

The presence of polychloroprene branches in the hexane soluble rubber was also indicated by the increased iodine numbers as compared to the chlorobutyl starting material. Thus, the hexane soluble graft copolymer showed an iodine number of 10.28 whereas the iodine number of the chlorobutyl used to initiate the grafting reaction was only 7.54.

EXAMPLE 25

Grafting Chloroprene Onto Chlorobutyl Rubber

The charge, 7.5 ml (7.2 g) chloroprene in 50 ml n-hexane in the presence of 0.33 ml (0.32 g or 0.0025 moles) AlEt$_2$Cl, was stirred at −40°C. To this system a precooled solution of 7.5 g chlorobutyl in 150 ml hexane was introduced. The system immediately became yellow. The reaction was terminated after 30 minutes of stirring by introducing methanol containing a stabilizer. In the course of the reaction, numerous samples were withdrawn for analytical purposes and to check the solubilities. All the samples were soluble in toluene. After washing the product thoroughly in methanol the polymer product was extracted with n-hexane and after reprecipitation in methanol and drying in vacuum at 50°C. a total of 5.730 g hexane soluble material was recovered. This product was analyzed for chlorine. The analysis showed the presence of 1.91 wt. percent Cl. The chlorobutyl used to initiate the grafting reaction contained 1.40 wt. percent Cl. These data indicated grafting since polychloroprene is insoluble in n-hexane, however, the hexane soluble fraction contained 0.51 wt. percent more chlorine than the original chlorobutene introduced. Iodine number analysis also corroborated the presence of graft copolymer. Thus, whereas the iodine number of the original chlorobutyl was 7.93, the iodine number of the hexane soluble product was 10.66. Finally, the intrinsic viscosity of chlorobutyl in diisobutylene solution was 1.247 corresponding to a viscosity average molecular weight of 371,500, the intrinsic viscosity of the hexane soluble graft copolymer under the same conditions was 1.536 corresponding to a viscosity average molecular weight of 515,000.

EXAMPLE 26

Polymer Degradation Studies

A series of experiments were carried out with the AlCl$_3$, AlEtCl$_2$, AlEt$_2$Cl, AlEt$_3$ catalyst series to (a) to study polymer, e.g., chlorobutyl, and butyl degradation and (b) to distinguish AlEt$_2$Cl and AlEt$_3$ from the conventional AlEtCl$_2$ and AlCl$_3$ catalysts. Briefly, it was found that under these experimental conditions, AlEtCl$_2$ and AlCl$_3$ severely and immediately degraded chlorobutyl, whereas AlEt$_2$Cl was much milder and under suitable reaction conditions dis not degrade chlorobutyl. AlEt$_3$ did not degrade chlorobutyl at all.

The experimental procedure was as follows: A 5 wt. percent chlorobutyl or butyl rubber solution was prepared in n-hexane and stirred at the selected temperature (e.g., −10° or −50°C.) in the dry-box under nitrogen atmosphere. The precooled catalyst solution was introduced at 0 minute and aliquots of samples were removed 1/2, 1, 2, 3, 5, 10, 15, 20 and 30 minutes after catalyst introduction. The amount of catalyst added was calculated to correspond to a 1:1 stoichiometric ratio i.e., 1 mole of catalyst was added per atom of chlorine in chlorobutyl and the same quantity of catalyst was added to the butyl solutions as well. The aliquot (withdrawn) samples were introduced into test tubes containing methanol to terminate degradation and to precipitate the polymer. After drying, the molecular weights were determined.

Butyl rubber was not degraded at all in the presence of AlEt$_2$Cl catalyst at −10° or −50°C. However, severe molecular weight degradation occurred under essentially identical experimental conditions in the presence of AlEtCl$_2$ at −10° and −50°C.

Figure 2:
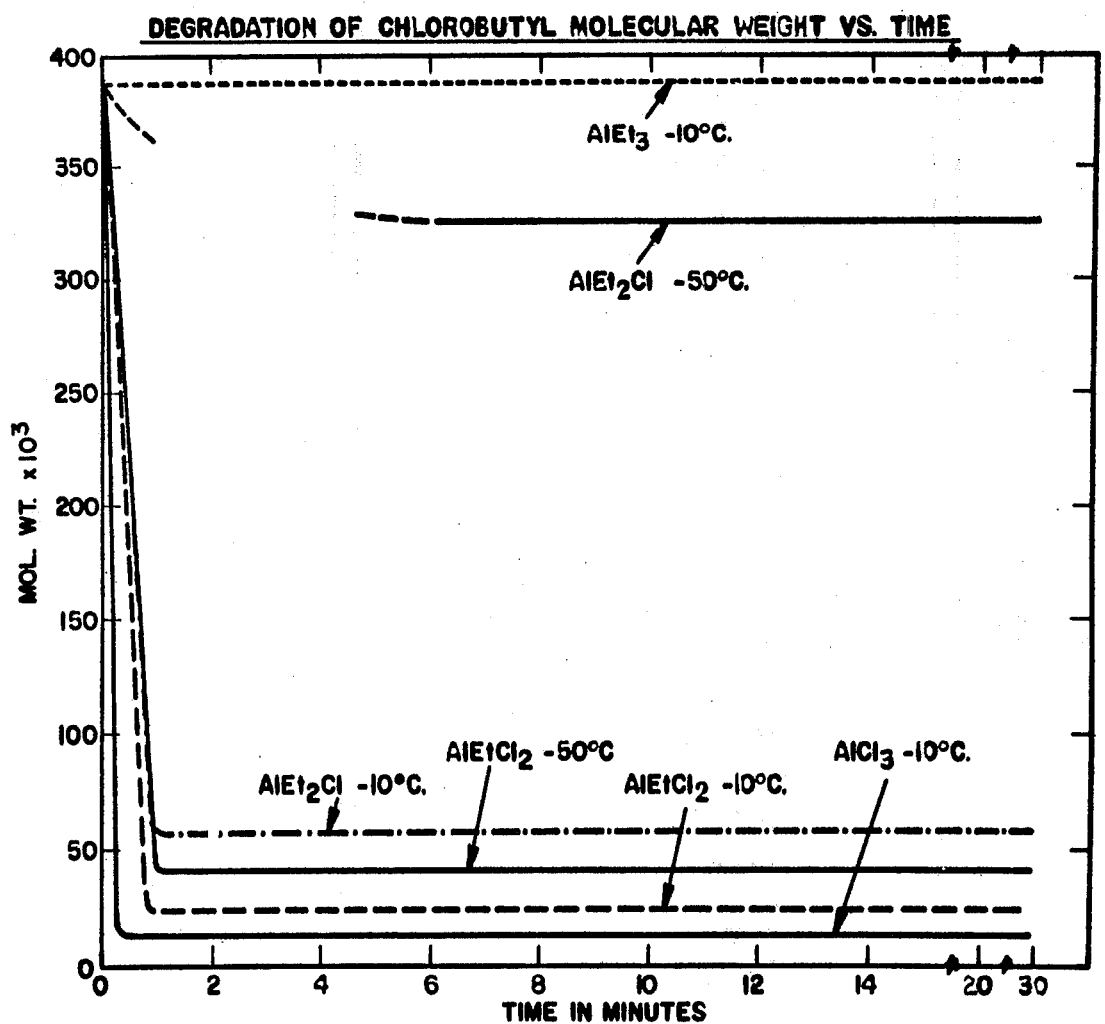

FIG. 2 shows experiments carried out with chlorobutyl. As the figure indicates, chlorobutyl did not degrade at all in the presence of AlEt$_3$ at −10°C. Little degradation occurred with AlEt$_2$Cl at −50°C. In contrast, chlorobutyl very severely degraded in the presence of AlEt$_2$Cl at −10°C. and in the presence of AlEtCl$_2$ and AlCl$_3$ at −50°C. and at −10°C.

These experiments show that under suitable conditions, little, if any, degradation occurs with the catalysts of the invention used in graft copolymerization. However, in the presence of conventional Friedel- Crafts catalysts, e.g., AlCl$_3$, AlEtCl$_2$ severe molecular weight breakdown occurs and even if grafting would be possible with these catalysts, the backbones would be severely damaged resulting in much inferior products.

Although the invention has been described with some degree of particularity, it will be understood that variations and modifications can be made therein without departing from the spirit of the invention as hereinafter claimed.

What is claimed is:

1. A process for preparing a graft copolymer which comprises reacting a cationically polymerizable monomer selected from the group consisting of sytrene, αmethyl styrene, p-chloro styrene, propene, 1-pentene, 2-ethyl-1-hexene, isoprene, chloroprene, dimethylbutadiene, piperylene, cyclopentadiene, cyclohexadiene, beta-pinene and methylene norbornene with a halogenated polymer selected from the group consisting of polychloroprene, halogenated polyisoprene, halogenated polybutadiene, halogenated polypiperylene and halogenated butyl rubber in the presence of a catalyst consisting essentially of a compound having the formula $AlM_2R$ wherein M is a $C_1$-$C_{12}$ alkyl radical and R is selected from the group consisting of M, hydrogen and halogen wherein said polymer is the backbone of said graft polymer, said reaction is carried out in an inert solvent at a temperature of from about −90° to about +70°C.

2. The process of claim 1 wherein the catalyst is selected from the group consisting of $AlR_3$ and $AlR_2X$ where R is a straight chain alkyl group having 1 to 12 carbon atoms and X is halogen.

3. The process of claim 1 wherein the catalyst is triethyl aluminum or diethyl aluminum chloride.

* * * * *